(12) United States Patent
Gal et al.

(10) Patent No.: US 6,367,417 B1
(45) Date of Patent: Apr. 9, 2002

(54) ELECTRONICALLY CONTROLLED ANIMAL FOOD DISPENSER

(75) Inventors: Michael Gal, P.O. Box 153, Moshav Beit HaLevi 42870 (IL); Yaacov Shevietzky, Hod Hasharon (IL)

(73) Assignee: Michael Gal, Moshav Beit Halevi (IL)

( * ) Notice: Subject to any disclaimer, the term of this patent is extended or adjusted under 35 U.S.C. 154(b) by 0 days.

(21) Appl. No.: 09/538,406

(22) Filed: Mar. 29, 2000

(30) Foreign Application Priority Data

Mar. 2, 2000 (IL) ................................................ 134860

(51) Int. Cl.⁷ .................................................. A01K 5/02
(52) U.S. Cl. ..................... 119/51.5; 119/51.11; 119/57.1
(58) Field of Search ........................... 119/51.11, 51.5, 119/56.1, 57.1; 222/77

(56) References Cited

U.S. PATENT DOCUMENTS

| | | | |
|---|---|---|---|
| 3,256,861 A | * 6/1966 | Giltner ..................... 119/51.11 |
| 3,532,075 A | 10/1970 | Cooper |
| 3,536,046 A | * 10/1970 | Lippi ......................... 119/51.5 |
| 3,599,608 A | 8/1971 | Esquival |
| 3,638,618 A | 2/1972 | Strother |
| 3,720,184 A | 3/1973 | Pearce |
| 3,730,141 A | 5/1973 | Manning et al. |
| 3,785,348 A | 1/1974 | Polidori, Sr. et al. |
| 3,935,837 A | 2/1976 | Mulhern |
| 3,962,997 A | 6/1976 | Ruth |
| 3,982,501 A | 9/1976 | Marzocco |
| 3,990,402 A | 11/1976 | Eriksson |
| 4,034,715 A | 7/1977 | Arner |
| 4,044,723 A | 8/1977 | Fitzpatrick |
| 4,051,812 A | 10/1977 | Deloach et al. |
| 4,069,793 A | 1/1978 | Gower |
| 4,079,699 A | * 3/1978 | Longmore et al. ....... 119/51.11 |
| 4,131,082 A | 12/1978 | Sollars |
| 4,162,683 A | 7/1979 | Brooks |
| 4,195,594 A | 4/1980 | Siciliano et al. |
| 4,211,795 A | 7/1980 | Leroy et al. |
| 4,235,200 A | 11/1980 | Shay |
| 4,256,054 A | 3/1981 | Hitchcock |
| 4,278,049 A | 7/1981 | Van Dusseldorp |
| 4,279,221 A | 7/1981 | Arvizu |
| 4,285,300 A | 8/1981 | Spane |
| 4,357,905 A | 11/1982 | Carpenter |
| 4,461,240 A | 7/1984 | Ostler |
| 4,497,280 A | 2/1985 | Sanstrom et al. |
| 4,532,891 A | 8/1985 | Jones |
| 4,580,529 A | 4/1986 | Wilson |
| 4,665,862 A | 5/1987 | Pitchford, Jr. |
| 4,699,089 A | 10/1987 | Teschke |
| 4,733,634 A | 3/1988 | Hooser |
| 4,735,171 A | 4/1988 | Essex |
| 4,756,277 A | 7/1988 | Peng |
| 4,889,077 A | 12/1989 | Possis |
| 4,966,098 A | 10/1990 | Freeman |
| 4,966,099 A | 10/1990 | Arney |
| 4,981,106 A | 1/1991 | Nagatomo |
| 4,993,364 A | 2/1991 | Hessenauer |
| 5,000,124 A | 3/1991 | Bergen |
| D321,769 S | 11/1991 | Schafer |
| D322,869 S | 12/1991 | Schafer |
| 5,107,795 A | 4/1992 | Curtis et al. |
| D330,098 S | 10/1992 | Vanskiver |
| 5,165,365 A | 11/1992 | Thompson |
| D334,251 S | 3/1993 | Tiu |
| D335,370 S | 5/1993 | Kirk |

(List continued on next page.)

Primary Examiner—Robert P. Swiatek
(74) Attorney, Agent, or Firm—Pillsbury Winthrop LLP

(57) ABSTRACT

A food dispenser including a feed hopper for storing therein animal food, a food dish for serving thereon the animal food to an animal, weighing apparatus including a load cell placed intermediate the food hopper and the food dish, a dispensing device operative to dispense food from the weighing apparatus to the food dish, and a controller in electrical communication with the load cell and the actuator, which controls dispensation of the animal food to the food dish.

24 Claims, 10 Drawing Sheets

U.S. PATENT DOCUMENTS

| | | |
|---|---|---|
| D335,939 S | 5/1993 | Cooper |
| 5,222,990 A | 6/1993 | Elliott |
| 5,230,300 A | 7/1993 | Mezhinsky |
| D338,287 S | 8/1993 | Tonner |
| D339,429 S | 9/1993 | Reid et al. |
| 5,259,336 A | 11/1993 | Clark |
| 5,265,560 A | 11/1993 | Dobbins |
| 5,301,634 A | 4/1994 | Ho |
| D348,336 S | 6/1994 | Woo |
| 5,345,892 A | 9/1994 | Khan |
| D351,261 S | 10/1994 | Woo |
| 5,355,833 A | 10/1994 | Legrain |
| 5,363,805 A | 11/1994 | Wing |
| 5,404,838 A | 4/1995 | Khan |
| 5,433,171 A | 7/1995 | Ewell |
| 5,467,735 A | 11/1995 | Chrisco |
| D364,942 S | 12/1995 | Vanskiver et al. |
| 5,483,923 A | 1/1996 | Sabbara |
| 5,555,842 A | 9/1996 | Chocola et al. |
| 5,556,000 A * | 9/1996 | Covington et al. ....... 222/77 X |
| 5,613,464 A | 3/1997 | Petzel |
| 5,778,820 A | 7/1998 | Van Der Lely et al. |
| 5,844,582 A | 12/1998 | Shioya |
| D405,560 S | 2/1999 | Chrisco |

\* cited by examiner

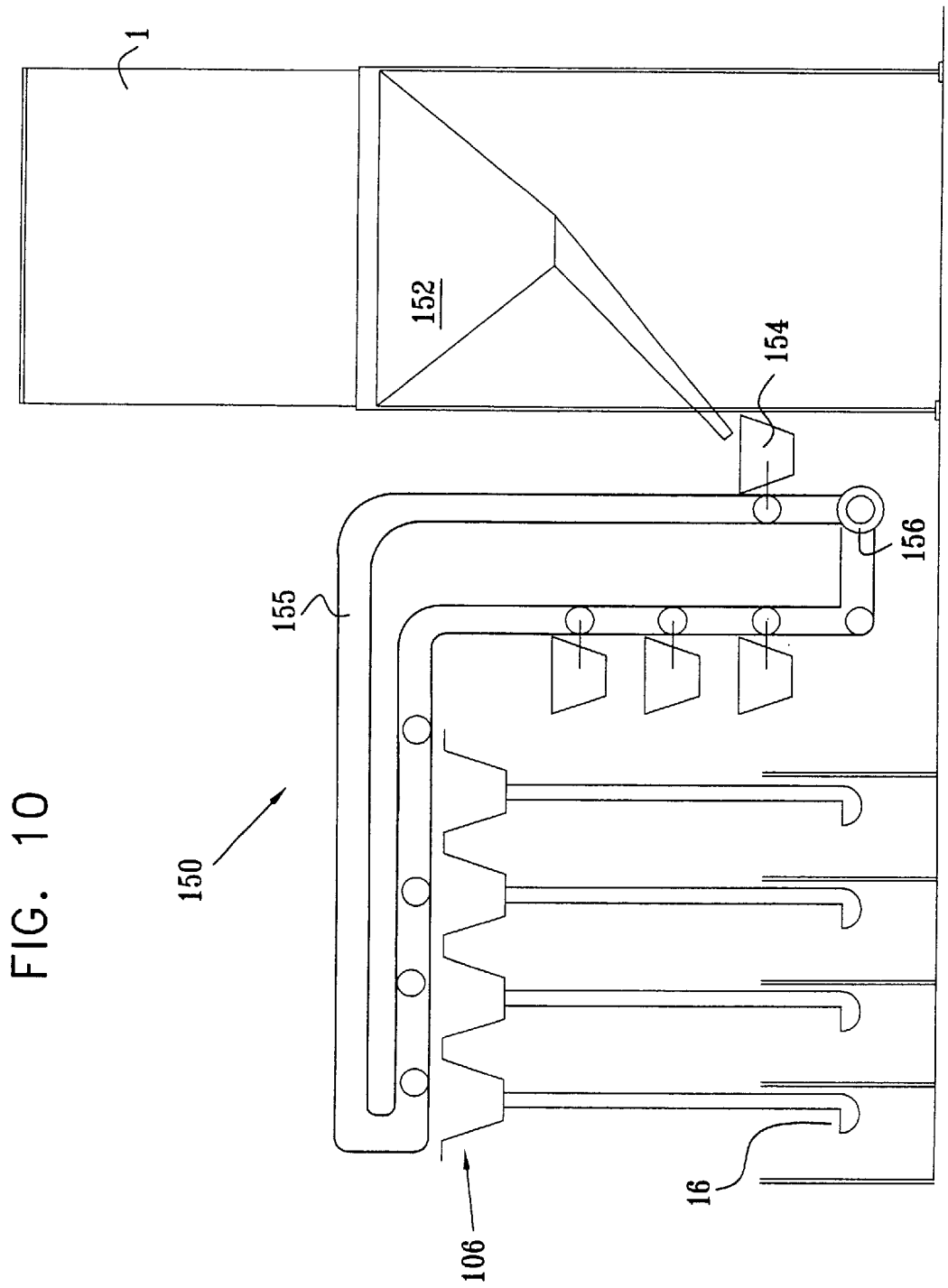

ELECTRONICALLY CONTROLLED ANIMAL FOOD DISPENSER

FIELD OF THE INVENTION

The present invention relates generally to electronically controlled animal food dispensers.

BACKGROUND OF THE INVENTION

Many kinds of animal food dispensers are known in the art. U.S. Pat. No. 3,962,997 to Ruth describes an animal feeder that conveys food from a storage bin by means of an auger to a plate from which an animal can eat. The feeder is not electronically controlled, however. U.S. Pat. No. 4,665,862 to Pitchford, Jr. and U.S. Pat. No. 4,735,171 to Essex also use augers to dispense food.

U.S. Pat. No. 5,433,171 to Ewell describes an automatic pet food dispenser that serves solid food and drinking water in separate dishes to an animal. Pressure sensors are provided underneath each dish and are connected to a microprocessor. The microprocessor controls filling of the dishes from a water supply tank and a feed hopper. The pressure sensors signal the microprocessor when to fill and when to stop filling the dishes. The feed mechanism from the feed hopper includes a motor driven, sliding plate at the bottom of the hopper that permits the contents of the hopper to flow down into the feed dish.

Other representative food dispensers include U.S. Pat. No. 4,993,364 to Hessenhauer, which describes an automatic pet food dispenser that employs a rotating tube to dispense food. U.S. Pat. No. 5,230,300 to Mezhinsky describes an automatic dry food feeder that employs rotating segmented flexible vanes to dispense food.

The food dispensers of the art suffer from several drawbacks. Augers are an effective conveyance means for seeds and small particles, but are not generally suitable for large particles, such as alfalfa cubes. The large particles tend to become broken when traveling through the auger. This is disadvantageous because some animals prefer chewing the large particles. More importantly, since the feed becomes broken, it is virtually impossible to ensure that the animal is being fed the proper amount of food according to veterinarian instructions. The rotary types of feeders mentioned above can be suitable for large particles, but take up significantly more volume than augers and are more expensive.

Another drawback of the prior art is that the automatic weighing devices of the art, such as that of Ewell, are not applicable for ensuring highly accurate dispensing of food to a multiplicity of animals.

SUMMARY OF THE INVENTION

The present invention seeks to provide an improved animal food dispenser that has several advantages over the prior art, and which solves the abovementioned problems of the prior art. The present invention provides a uniquely shaped auger housing that can convey solid, relatively hard food particles to a food dish without danger of breaking the food particles.

In addition, the present invention employs a load cell placed intermediate a food hopper and a solid food dish, which controls the amount of food in the dish. An electronic valve is placed intermediate a liquid supply line and a liquid food dish, which controls the amount of liquid, e.g., water, present in the liquid food dish. The food dishes have load cells mounted underneath them to monitor the amount of food and liquid the animal ate and drank.

It is important to note an advantage of the present invention over the prior art. In the prior art, load cells are provided only at the individual food and water dishes. These load cells indicate whether the weight of the dish is below a lower threshold or above an upper threshold. If the dish weight is below the lower threshold, then the dish is filled with food or water. If the dish weight is above the upper threshold, then the filling is stopped. Thus, the dish load cells control the amount of food or water present in the food or water dish.

In contrast, in the present invention, the dish load cells do not control the amount of food or water present in the solid and liquid food dishes. Instead the intermediate load cell controls the amount of food and the electronic valve controls the amount of liquid. The intermediate load cell has the added benefit of providing information regarding the level of food remaining in hopper. In the prior art, the dish load cells cannot provide this information and the user does not know how much food is left in the hopper. Other advantages of the present invention will become apparent to the skilled artisan from the description hereinbelow.

There is thus provided in accordance with a preferred embodiment of the present invention a food dispenser including a feed hopper for storing therein animal food, a food dish for serving thereon the animal food to an animal, weighing apparatus including a load cell placed intermediate the food hopper and the food dish, a dispensing device operative to dispense food from the weighing apparatus to the food dish, and a controller in electrical communication with the load cell and the actuator, which controls dispensation of the animal food to the food dish.

In accordance with a preferred embodiment of the present invention a feeder mechanism is provided that includes an auger journaled in a housing, the housing including an inlet in communication with the hopper, the feeder mechanism being operative to convey food from the hopper to the weighing apparatus.

Further in accordance with a preferred embodiment of the present invention the housing has a generally pear-shaped inner volume defined by a generally cylindrical portion in which the auger rotates, and a tapered portion above the cylindrical portion.

Still further in accordance with a preferred embodiment of the present invention the feeder mechanism further includes a motor operatively connected to the auger for rotating the auger.

In accordance with a preferred embodiment of the present invention a control panel is in electrical communication with the controller, mounted on the hopper for displaying pertinent information related to feeding of an animal.

Further in accordance with a preferred embodiment of the present invention a volume sensor is mounted in the hopper that constantly monitors a volume of the animal food in the hopper.

Still further in accordance with a preferred embodiment of the present invention the load cell is placed upon a weighing platform, and the dispensing device includes an electronic lock device in electrical communication with the controller, the lock device supporting the weighing platform, the lock device being selectively opened by the controller, thereby moving the platform to an open position and permitting passage of food from the weighing apparatus to the food dish.

Additionally in accordance with a preferred embodiment of the present invention the dispensing device includes an actuator that moves the platform from the open position to a closed position. Preferably another load cell is mounted below the food dish in electrical communication with the controller.

In accordance with a preferred embodiment of the present invention an electronic valve is in electrical communication with the controller, operative to control flow of a liquid from a supply line to a liquid food dish. Preferably an additional load cell is mounted below the liquid food dish in electrical communication with the controller.

Further in accordance with a preferred embodiment of the present invention a pressure relief device is provided that relieves overpressure in the hopper. Preferably the pressure relief device includes a frangible metal strip.

BRIEF DESCRIPTION OF THE DRAWINGS

The present invention will be understood and appreciated more fully from the following detailed description, taken in conjunction with the drawings in which:

FIG. 10 is a simplified schematic illustration of an animal food dispenser for a multiplicity of animals, constructed and operative in accordance with another preferred embodiment of the present invention.

DETAILED DESCRIPTION OF A PREFERRED EMBODIMENT

Figure 1:
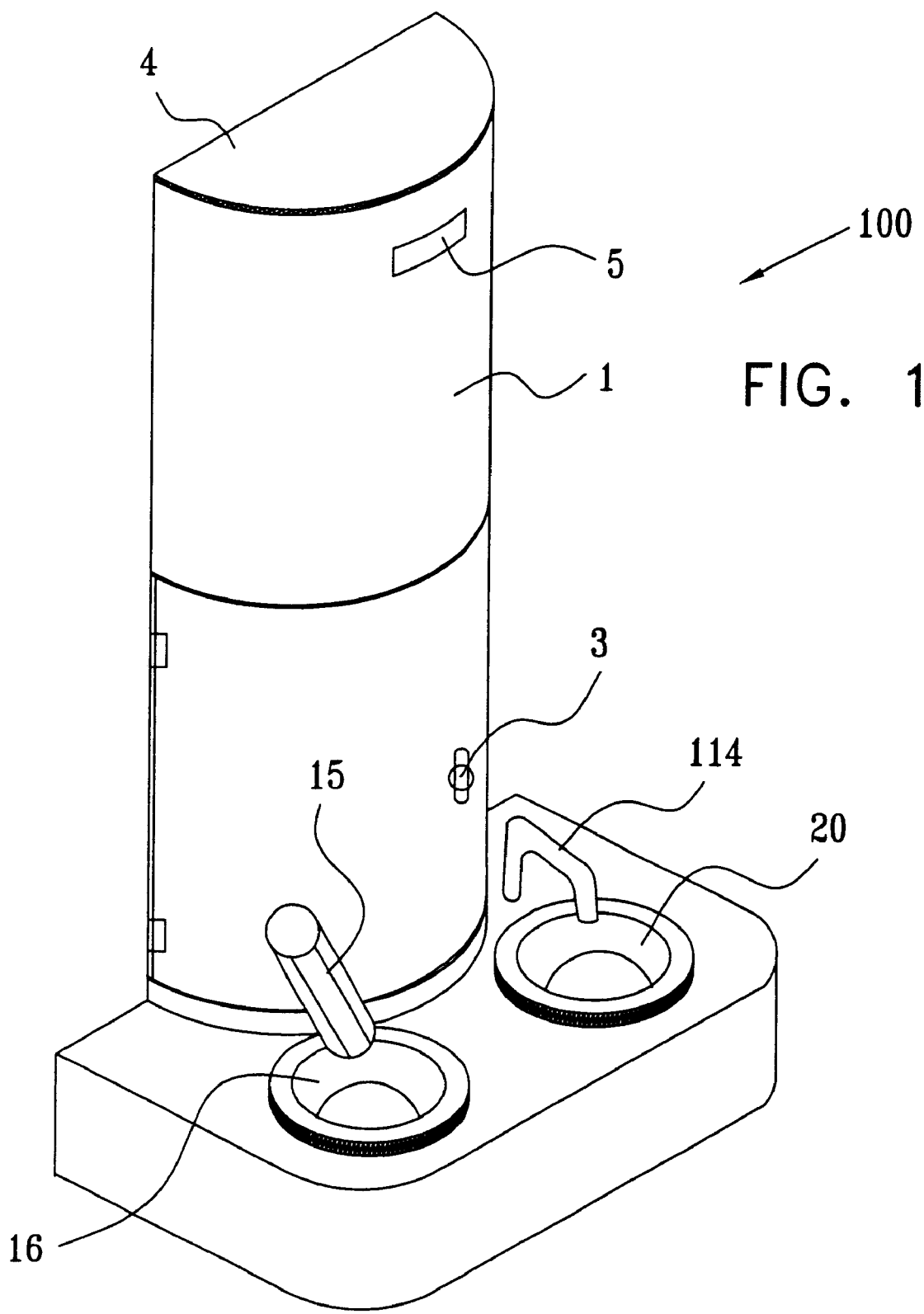
FIG. 1 is a simplified pictorial illustration of an animal food dispenser constructed and operative in accordance with a preferred embodiment of the present invention.
Figure 2:
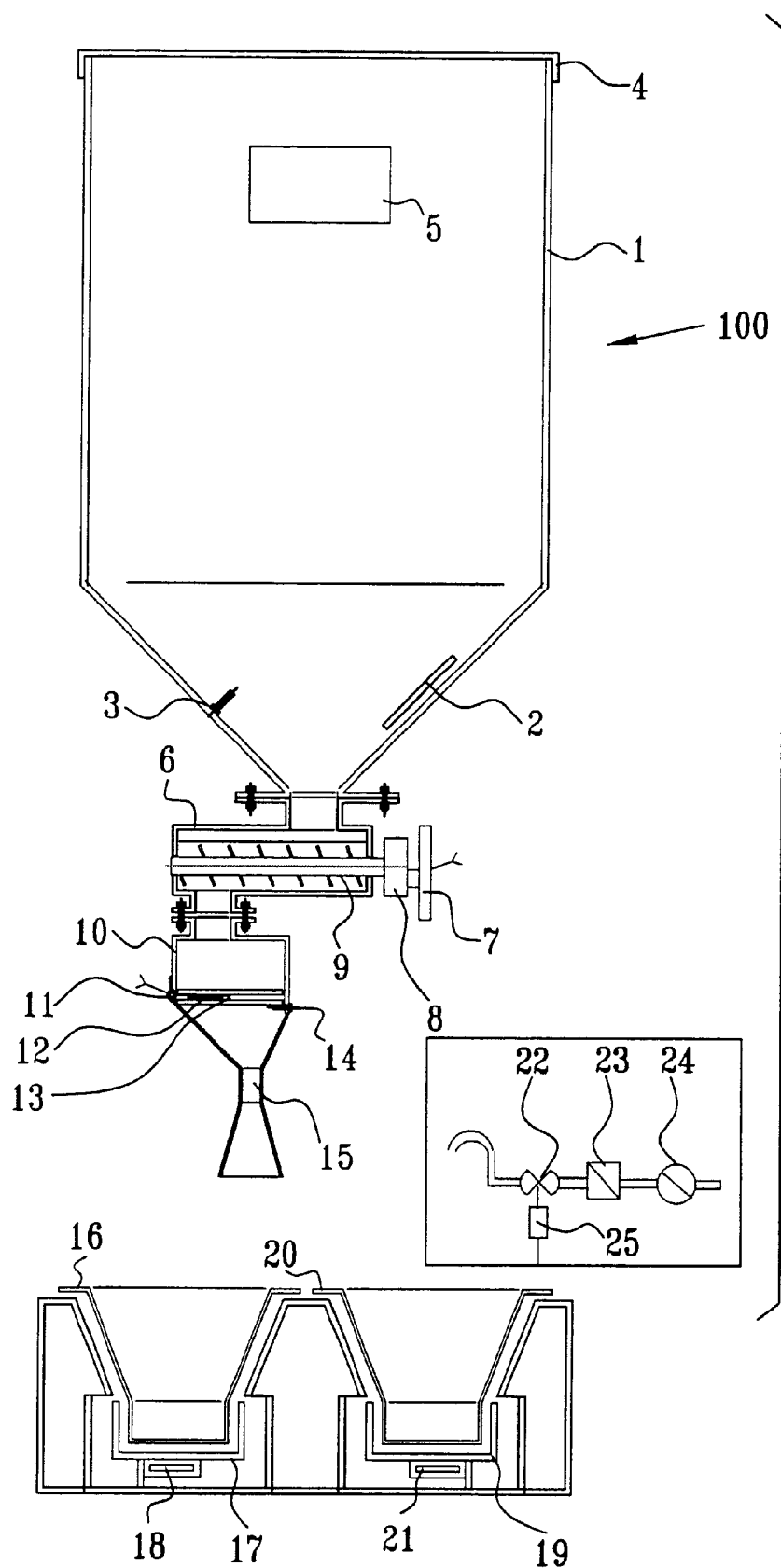
FIG. 2 is a simplified schematic illustration of the animal food dispenser of FIG. 1.

Reference is now made to FIGS. 1 and 2 which illustrate an animal food dispenser 100 constructed and operative in accordance with a preferred embodiment of the present invention.

Figure 3:
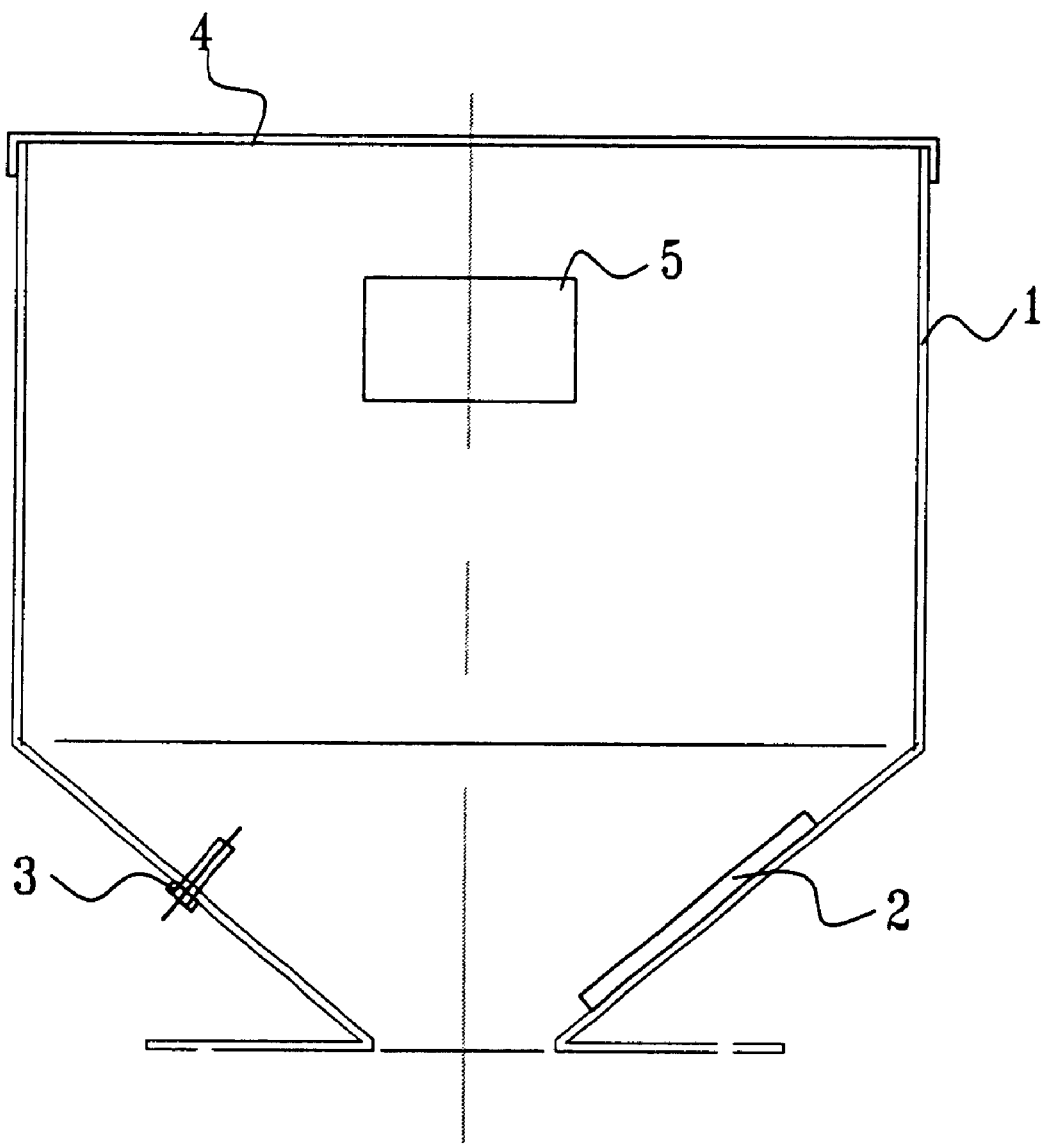
FIG. 3 is a simplified illustration of a feed hopper of the animal food dispenser of FIG. 1, constructed and operative in accordance with a preferred embodiment of the present invention.

Food dispenser 100 preferably includes a feed hopper 1 for storing therein feed, such as grain, seeds, pellets and the like. Hopper 1 (shown also in FIG. 3) preferably includes a pressure relief device 2, such as a frangible metal strip that relieves overpressure in hopper 1. A volume sensor 3 is preferably mounted in hopper 1 that constantly monitors the volume of feed in hopper 1, and is in electrical communication with a controller 25 (further described hereinbelow with reference to FIG. 8). A control panel 5 is preferably mounted on hopper 1 for displaying pertinent information related to the feeding of animals (further described hereinbelow with reference to FIG. 9). A cover 4 helps seal hopper 1 such that the contents do not become contaminated.

Figure 4A:
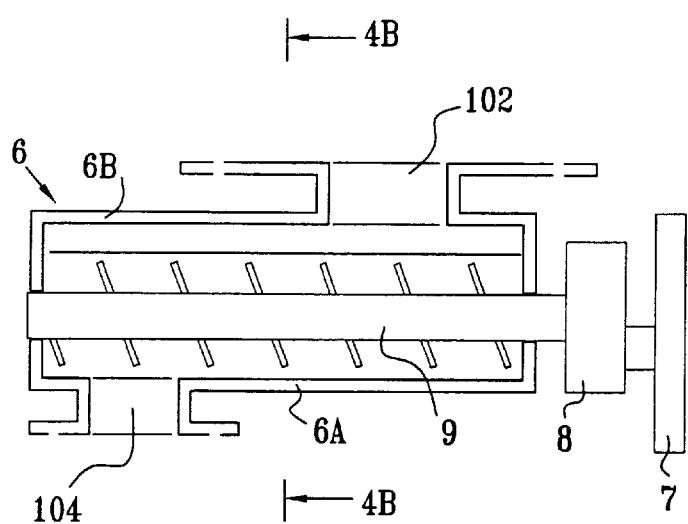
FIGS. 4A and 4B are simplified illustrations of a feed auger of the animal food dispenser of FIG. 1, constructed and operative in accordance with a preferred embodiment of the present invention, FIG. 4B being taken along lines 4B—4B in FIG. 4A.
Figure 4B:
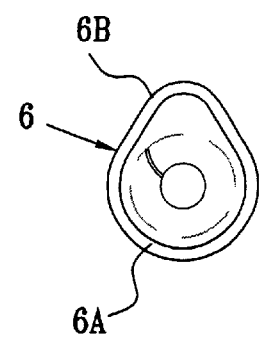

Referring additionally to FIG. 4A, dispenser 100 preferably includes a feeder mechanism that includes an auger 9 journaled in a housing 6. Housing 6 preferably has an inlet 102 in communication with hopper 1, and an outlet 104 that communicates with weighing apparatus 106, described hereinbelow with reference to FIG. 5. In accordance with a preferred embodiment of the present invention, housing 6 a generally pear-shaped inner volume defined by a generally cylindrical portion 6A in which said auger 9 rotates, and a tapered portion 6B above cylindrical portion 6A. The unique construction of housing 6 ensures that any food particles, even large ones, will not be broken by auger 9 during transportation. One of the reasons is the additional volume of the tapered portion 6B that lets the particles move about without getting squeezed or crushed. In prior art augers, the food particles travel through a cylinder without any extra "room", and can get crushed or squeezed. Auger 9 is preferably rotated by means of a motor 7, which is preferably connected to auger 9 through a reduction gear 8.

Figure 5:
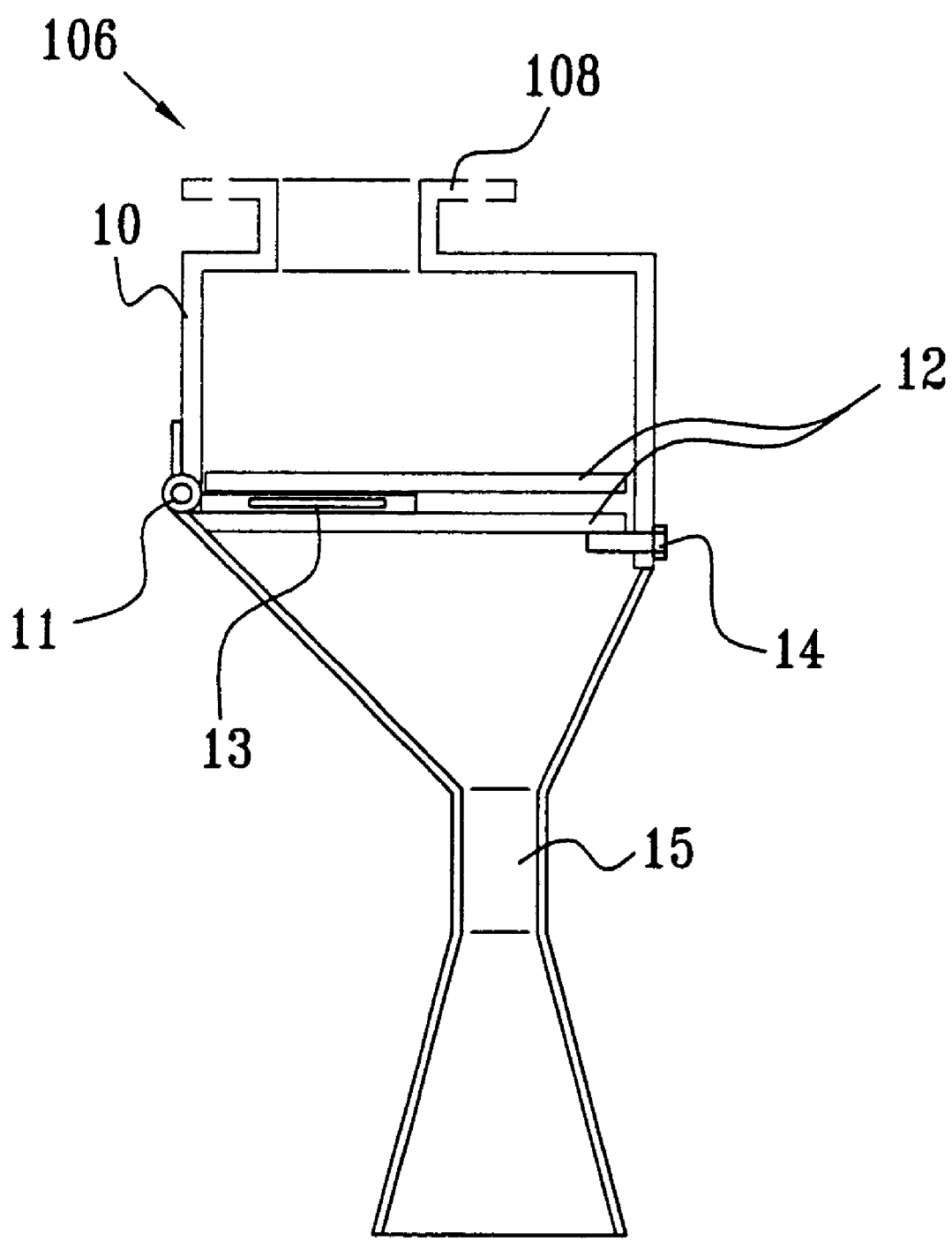
FIG. 5 is a simplified illustration of weighing apparatus of the animal food dispenser of FIG. 1, constructed and operative in accordance with a preferred embodiment of the present invention.

Referring additionally to FIG. 5, it is seen that weighing apparatus 106 preferably includes a weighing chamber 10 that has an inlet flange 108 that connects to outlet 104 of housing 6. Chamber 10 preferably has a volume sufficient for one feeding of an animal, although other sizes may also be used. Chamber 10 is preferably connected to a funnel-shaped chute 15. A pair of weighing platforms 12 are preferably disposed at the juncture of chamber 10 with chute 15. Platforms 12 are preferably separated by a pressure sensor or load cell 13. In a preferred embodiment, load cell 13 is attached to the lower platform 12, which is relatively rigid. The upper platform 12 is preferably flexible, such that food particles weighing down on the upper platform cause the platform to press against load cell 13. The lower platform 12 is preferably supported by an electronic lock device 14, which is in electrical communication with controller 25. Lock device 14 opens and closes upon command from controller 25, to permit or prevent passage of food from chamber 10 to chute 15. If lock device 14 is opened, the platforms 12 pivot down and the food flows to chute 15. An actuator 11, such as a solenoid or motor, is preferably connected to platforms 12 and returns the platforms 12 back to the weighing position. Actuator 11 and lock device 14 make up a dispensing device.

Figure 6:
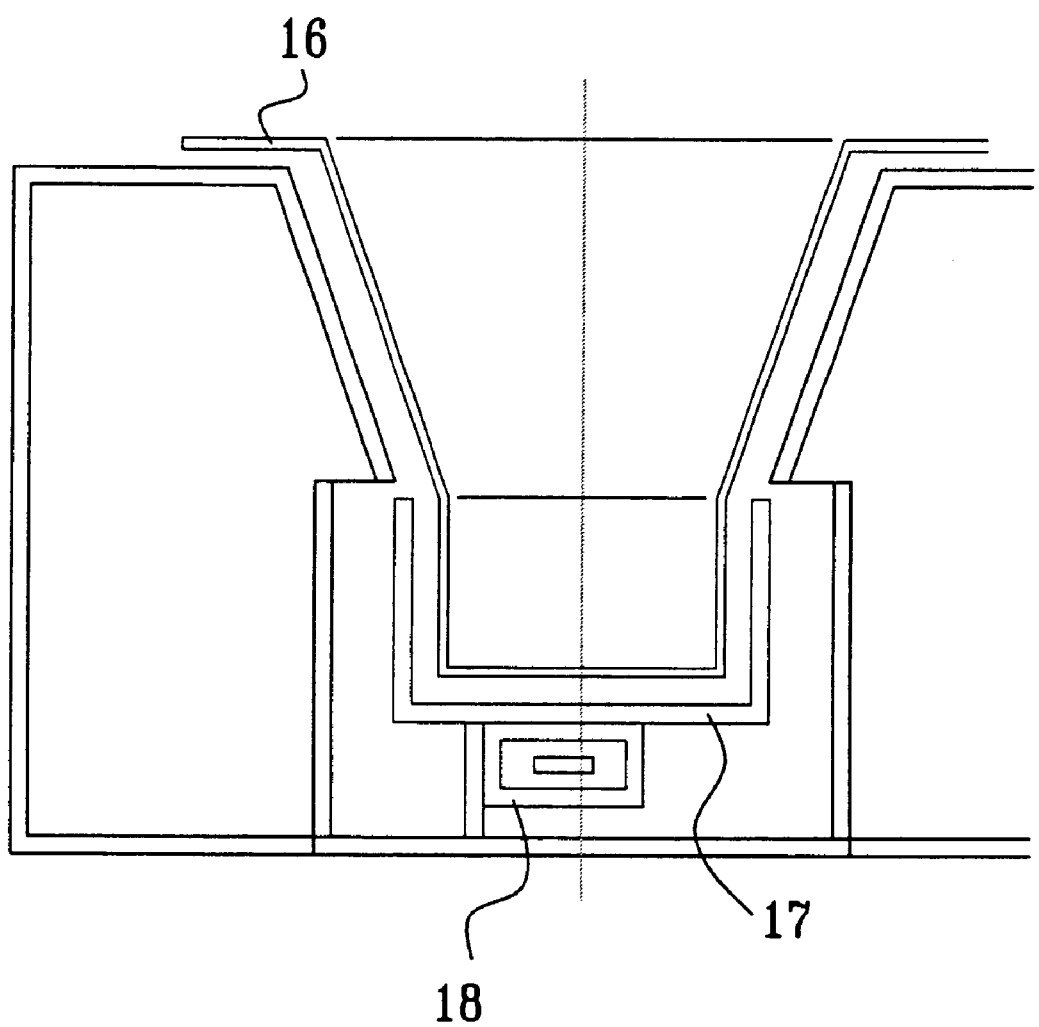
FIG. 6 is a simplified illustration of a solid food dish of the animal food dispenser of FIG. 1, constructed and operative in accordance with a preferred embodiment of the present invention.

Referring additionally to FIG. 6, dispenser 100 preferably includes a solid food dish 16 that rests upon a support 17. A pressure sensor or load cell 18 is preferably mounted below support 17 and in electrical communication with controller 25. Load cell 18 preferably communicates to controller 25 the current weight of the food in dish 16, before controller 25 causes more food to be added to dish 16.

Figure 7:
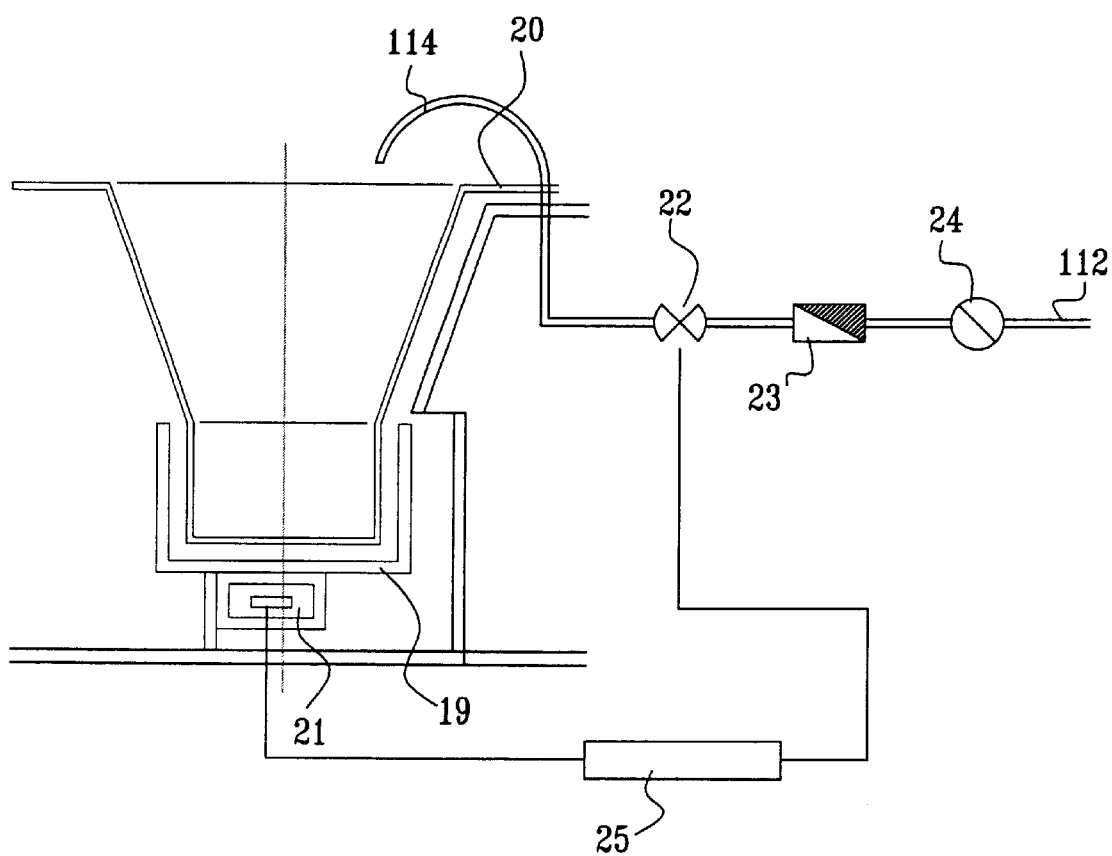
FIG. 7 is a simplified illustration of a liquid food dish of the animal food dispenser of FIG. 1, constructed and operative in accordance with a preferred embodiment of the present invention.

Referring additionally to FIG. 7, dispenser 100 preferably includes a liquid food dish 20 that rests upon a support 19. A pressure sensor or load cell 21 is preferably mounted below support 19 and in electrical communication with controller 25. Load cell 21 preferably communicates to controller 25 the current weight of the liquid, such as water, in dish 20, before controller 25 causes more liquid to be added to dish 20.

Liquid is preferably supplied to dish 20 from a liquid supply line 112. The liquid preferably flows via a supply valve 24 to a pressure regulator 23, which reduces the supply pressure. An electronic valve 22 is preferably in electrical communication with controller 25 and controls the flow of the liquid through an inlet tube 114 to dish 20.

It is noted that the actual structure and shape of chute 15, inlet tube 114 and dishes 16 and 20 can be varied in accordance with the needs of a particular animal. FIGS. 1 and 2 illustrate two different configurations of chute 15, inlet tube 114 and dishes 16 and 20. The embodiment of FIG. 1 is intended for home use for feeding pets, whereas the embodiment of FIG. 2 is intended for barn, farm, stable or factory use, for feeding and fattening livestock and the like. It is appreciated that any other configuration is also within the scope of the invention.

It is important to note an advantage of the present invention over the prior art. In the prior art, load cells are provided only at the individual food and water dishes. These load cells indicate whether the weight of the dish is below a lower threshold or above an upper threshold. If the dish weight is below the lower threshold, then the dish is filled with food or water. If the dish weight is above the upper threshold, then the filling is stopped. Thus, the dish load cells control the amount of food or water present in the food or water dish.

In contrast, in the present invention, the dish load cells 18 and 21 do not control the amount of food or water present in the solid and liquid food dishes 16 and 20, respectively. Instead the additional load cell 13 placed intermediate the food hopper and solid food dish 16, and the electronic valve 22 placed intermediate the supply line 112 and liquid food dish 20, together with controller 25, control the amount of food or water present in the solid and liquid food dishes 16 and 20, respectively. The dish load cells 18 and 21 are used to monitor the amount of food the animal ate or drank. Load cell 13 has the added benefit of providing information regarding the level of food remaining in hopper 1. In the prior art, the dish load cells cannot provide this information and the user does not know how much food is left in the hopper.

Figure 8:
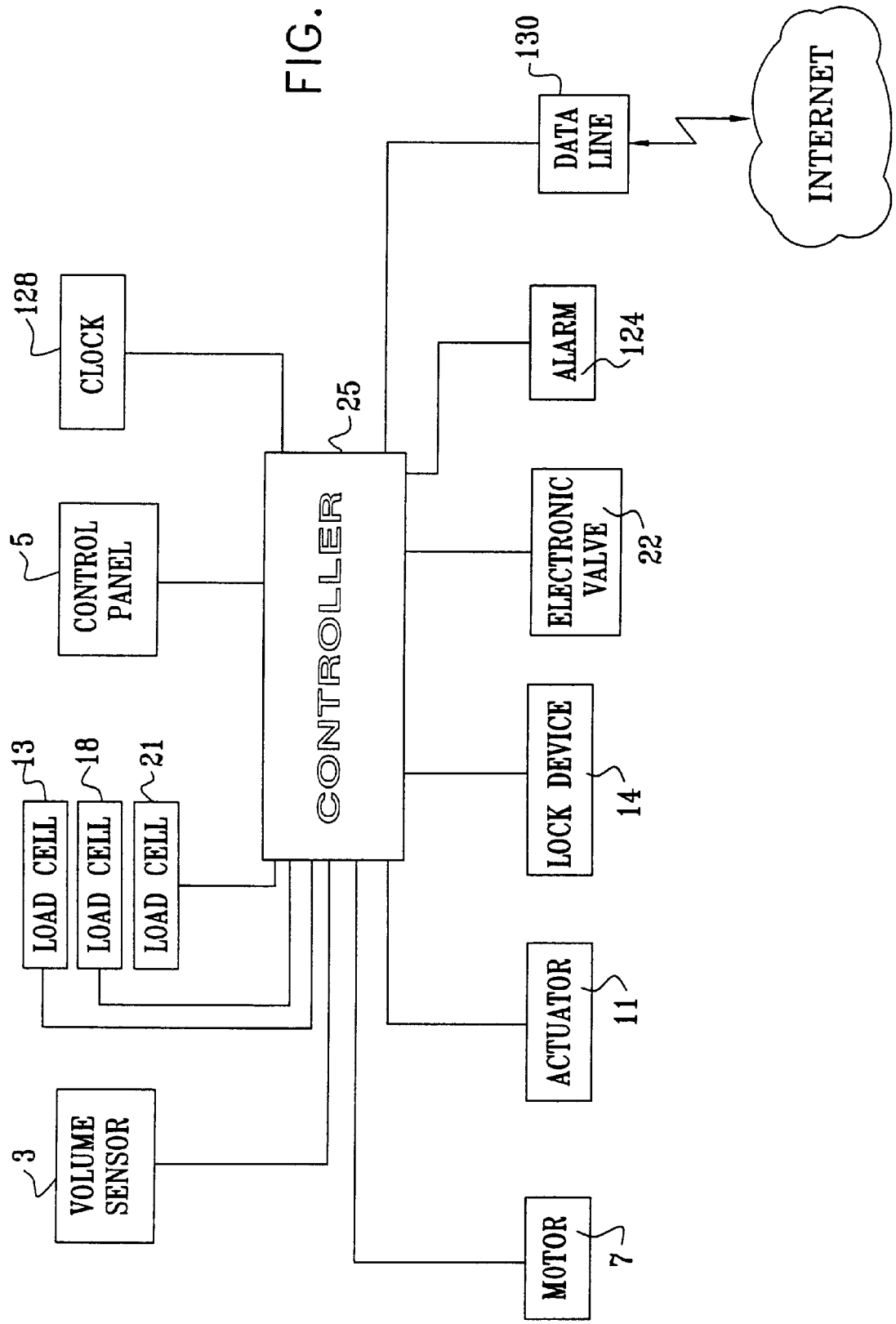
FIG. 8 is a simplified block diagram of a controller of the animal food dispenser of FIG. 1, which controls operation of the animal food dispenser, constructed and operative in accordance with a preferred embodiment of the present invention.
Figure 9:
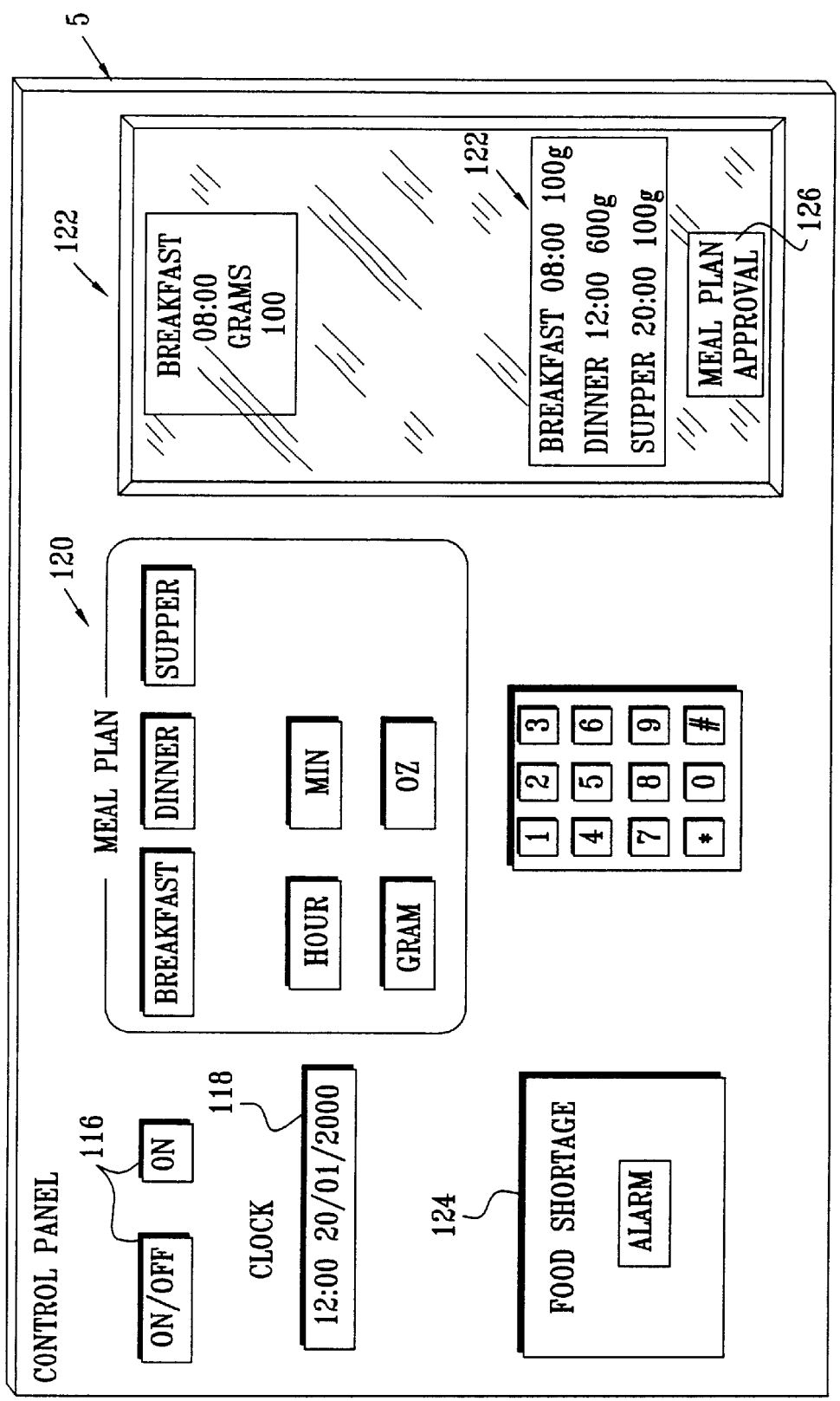
FIG. 9 is a simplified illustration of a control panel of the animal food dispenser of FIG. 1, constructed and operative in accordance with a preferred embodiment of the present invention.

Reference is now made to FIGS. 8 and 9 which further illustrate controller 25 and control panel 5 of animal food dispenser 100. Control panel 5 (FIG. 9) preferably includes an on/off switch 116, a clock 1 18, and a plurality of control buttons 120 for determining a meal plan. For example, one can select a meal, choosing from breakfast, dinner and supper. Buttons may be provided for setting the time and volume of the meal, as well as the units of measure. Displays 122 are preferably provided for displaying the selected meal parameters. An alarm 124 may be provided for indicating an alarm in the event of a food shortage in hopper 1. Another display 126 may be provided for indicating approval of the meal plan.

Controller 25 (FIG. 8) is preferably in electrical communication, wired or wireless, with a clock 128 (for timekeeping and timing purposes), control panel 5, load cells 13, 18 and 21, auger motor 7, actuator 11, electronic valve 22, alarm 124 and a data line 130 connected to a server or the Internet, for example. Data line 130 enables remote monitoring and data input/output with respect to controller 25.

The following is a description of a typical operational mode of animal food dispenser 100, in accordance with a preferred embodiment of the present invention. A user first fills hopper 1 with food granules, seeds, pellets or cubes, as desired. The user turns on dispenser 100 by pressing on the on/off switch 116, and creates a meal plan by selecting, for example, 100 g of dog food to be served for breakfast at 08:00, 600 g for dinner at 12:00 and 100 g for supper at 20:00. At a predetermined time before meal time, motor 7 is commanded by controller 25 to turn auger 9 and convey food to weighing apparatus 106. Once load cell 13 senses that the correct amount of food has been weighed on platforms 12, motor 7 stops turning auger 9. When the meal time arrives, lock device 14 opens and the food drops from platforms 12 through chute 15 to solid food dish 16. Similarly, valve 22 is opened to allow water or other liquid to flow to dish 20. Actuator 11 then brings back platforms 12 to the closed position, and valve 22 is closed.

Reference is now made to FIG. 10 which illustrates an animal food dispenser 150 for a multiplicity of animals, constructed and operative in accordance with another preferred embodiment of the present invention. Dispenser 150 is preferably constructed basically the same as dispenser 100 described hereinabove, with like elements being designated by like numerals. In dispenser 150, hopper 1 preferably empties into a funnel 152 that conveys food particles into one of a plurality of buckets 154 that move along a conveyor track 155 by means of a conveyor drive 156. The buckets 154 convey the food to a plurality of weighing apparatus 106, described hereinabove with reference to FIG. 5. The rest of dispenser 150 is basically the same as dispenser 100. (Liquid food dishes are also provided in the system of dispenser 150 as in dispenser 100, but are not shown for the sake of simplicity in FIG. 10.)

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A food dispenser comprising:
   a feed hopper for storing therein animal food;
   a food dish for serving thereon the animal food to an animal;
   weighing apparatus comprising a load cell placed intermediate said food hopper and said food dish;
   a dispensing device operative to dispense food from said weighing apparatus to said food dish;
   a controller in electrical communication with said load cell and said dispensing device, which controls dispensation of the animal food to said food dish; and
   a volume sensor mounted in said hopper that constantly monitors a volume of the animal food in said hopper.

2. The food dispenser according to claim 1 and further comprising a feeder mechanism that includes an auger journaled in a housing, said housing comprising an inlet in communication with said hopper, said feeder mechanism being operative to convey food from said hopper to said weighing apparatus.

3. The food dispenser according to claim 2 wherein said housing has a generally pear-shaped inner volume defined by a generally cylindrical portion in which said auger rotates, and a tapered portion above said cylindrical portion.

4. The food dispenser according to claim 2 wherein said feeder mechanism further comprises a motor operatively connected to said auger for rotating said auger.

5. The food dispenser according to claim 1 and further comprising a control panel in electrical communication with said controller, mounted on said hopper for displaying pertinent information related to feeding of an animal.

6. The food dispenser according to claim 1 and further comprising a liquid food dish.

7. The food dispenser according to claim 6 and further comprising an electronic valve in electrical communication with said controller, operative to control flow of a liquid from a supply line to said liquid food dish.

8. The food dispenser according to claim 1 and further comprising a pressure relief device that relieves overpressure in said hopper.

9. A food dispenser according to claim 1 wherein said contoller is in electrical communication with an information network.

10. A food dispenser according to claim 9 wherein said controller is in wireless electrical communication with an information network.

11. A food dispenser according to claim 9 wherein said information network comprises the Internet.

12. A food dispenser according to claim 1 and further comprising a pressure relief device that relieves overpressure in said hopper, wherein said pressure relief device comprises a frangible metal strip.

13. A food dispenser according to claim 1 and further comprising another load cell mounted below said food dish in electrical communication with said controller.

14. A food dispenser according to claim 1 wherein said load cell is placed upon a weighing platform, and said dispensing device comprises an electronic lock device in electrical communication with said controller, said lock device supporting said weighing platform, said lock device being selectively opened by said controller, thereby moving said platform to an open position and permitting passage of food from said weighing apparatus to said food dish.

15. A food dispenser comprising:
   a feed hopper for storing therein animal food;
   a food dish for serving thereon the animal food to an animal;
   weighing apparatus comprising a load cell placed intermediate said food hopper and said food dish;
   a dispensing device operative to dispense food from said weighing apparatus to said food dish; and
   a controller in electrical communication with said load cell and said dispensing device, which controls dispensation of the animal food to said food dish,
   wherein said load cell is placed upon a weighing platform, and said dispensing device comprises an electronic lock device in electrical communication with said controller, said lock device supporting said weighing platform, said lock device being selectively opened by said controller, thereby moving said platform to an open position and permitting passage of food from said weighing apparatus to said food dish.

16. The food dispenser according to claim 15 wherein said dispensing device comprises an actuator that moves said platform from the open position to a closed position.

17. A food dispenser according to claim 15 and further comprising a pressure relief device that relieves overpressure in said hopper, wherein said pressure relief device comprises a frangible metal strip.

18. A food dispenser according to claim 15 and further comprising another load cell mounted below said food dish in electrical communication with said controller.

19. A food dispenser according to claim 15 and further comprising
   a liquid food dish; and
   an additional load cell mounted below said liquid food dish in electrical communication with said controller.

20. A food dispenser comprising:
   a feed hopper for storing therein animal food;
   a food dish for serving thereon the animal food to an animal;
   weighing apparatus comprising a first load cell placed intermediate said food hopper and said food dish;
   a dispensing device operative to dispense food from said weighing apparatus to said food dish;
   a controller in electrical communication with said load cell and said dispensing device, which controls dispensation of the animal food to said food dish, and
   a second load cell mounted below said food dish in electrical communication with said controller.

21. A food dispenser according to claim 20 and further comprising a pressure relief device that relieves overpressure in said hopper, wherein said pressure relief device comprises a frangible metal strip.

22. A food dispenser according to claim 20 and further comprising
   a liquid food dish; and
   an additional load cell mounted below said liquid food dish in electrical communication with said controller.

23. A food dispenser comprising:
   a feed hopper for storing therein animal food;
   a food dish for serving thereon the animal food to an animal;
   weighing apparatus comprising a load cell placed intermediate said food hopper and said food dish;
   a dispensing device operative to dispense food from said weighing apparatus to said food dish;
   a controller in electrical communication with said load cell and said dispensing device, which controls dispensation of the animal food to said food dish;
   a liquid food dish; and
   an additional load cell mounted below said liquid food dish in electrical communication with said controller.

24. A food dispenser comprising:
   a feed hopper for storing therein animal food;
   a food dish for serving thereon the animal food to an animal;
   weighing apparatus comprising a load cell placed intermediate said food hopper and said food dish;
   a dispensing device operative to dispense food from said weighing apparatus to said food dish;
   a controller in electrical communication with said load cell and said
   dispensing device, which controls dispensation of the animal food to said food dish; and
   a pressure relief device that relieves overpressure in said hopper, wherein said pressure relief device comprises a frangible metal strip.

* * * * *